US008601380B2

(12) United States Patent
Vaittinen et al.

(10) Patent No.: US 8,601,380 B2
(45) Date of Patent: Dec. 3, 2013

(54) METHOD AND APPARATUS FOR DISPLAYING INTERACTIVE PREVIEW INFORMATION IN A LOCATION-BASED USER INTERFACE

(75) Inventors: Tuomas Vaittinen, Helsinki (FI); Brenda Castro, Helsinki (FI); David Joseph Murphy, Helsinki (FI)

(73) Assignee: Nokia Corporation, Espoo (FI)

( * ) Notice: Subject to any disclaimer, the term of this patent is extended or adjusted under 35 U.S.C. 154(b) by 147 days.

(21) Appl. No.: 13/049,270

(22) Filed: Mar. 16, 2011

(65) Prior Publication Data
US 2012/0240077 A1 Sep. 20, 2012

(51) Int. Cl.
*G06F 3/048* (2013.01)
*G06F 3/00* (2006.01)

(52) U.S. Cl.
USPC ........... 715/757; 715/744; 715/756; 715/773; 715/781; 345/8; 345/9; 345/156; 345/157

(58) Field of Classification Search
USPC .......... 715/781, 744, 756, 757, 773; 345/8, 9, 345/156, 157
See application file for complete search history.

(56) References Cited

U.S. PATENT DOCUMENTS

| | | | |
|---|---|---|---|
| 5,319,747 A * | 6/1994 | Gerrissen et al. ............. | 715/839 |
| 6,426,757 B1 * | 7/2002 | Smith et al. .................... | 345/634 |
| 6,538,676 B1 * | 3/2003 | Peters ........................... | 715/863 |
| 6,771,294 B1 * | 8/2004 | Pulli et al. ...................... | 715/863 |
| 7,137,069 B2 * | 11/2006 | Abbott et al. ................. | 715/744 |
| 7,203,906 B2 * | 4/2007 | Abbott et al. ................. | 715/747 |
| 7,225,229 B1 * | 5/2007 | Abbott et al. ................. | 709/206 |
| 7,372,451 B2 * | 5/2008 | Dempski ....................... | 345/158 |
| 2002/0044152 A1 * | 4/2002 | Abbott et al. ................. | 345/629 |
| 2002/0093538 A1 * | 7/2002 | Carlin ........................... | 345/778 |
| 2003/0012409 A1 * | 1/2003 | Overton et al. ............... | 382/103 |
| 2003/0032876 A1 * | 2/2003 | Chen et al. .................... | 600/407 |
| 2003/0154476 A1 * | 8/2003 | Abbott et al. .................. | 725/37 |
| 2004/0070611 A1 * | 4/2004 | Tanaka et al. ................. | 345/757 |
| 2004/0104935 A1 * | 6/2004 | Williamson et al. .......... | 345/757 |
| 2004/0139156 A1 * | 7/2004 | Matthews et al. ............. | 709/204 |
| 2005/0027186 A1 * | 2/2005 | Chen et al. .................... | 600/407 |
| 2007/0162942 A1 * | 7/2007 | Hamynen et al. ............. | 725/105 |
| 2007/0273758 A1 | 11/2007 | Mendoza et al. | |

(Continued)

FOREIGN PATENT DOCUMENTS

| | | | |
|---|---|---|---|
| JP | 2007-206298 A | 8/2007 | |
| WO | WO 2010/052548 A2 | 5/2010 | |

OTHER PUBLICATIONS

International Search Report for PCT/FI2012/050077 dated Apr. 13, 2012, pp. 1-4.
International Written Opinion for PCT/FI2012/050077 dated Apr. 13, 2012, pp. 1-7.
Mixed Reality Architecture: a dynamic architectural topology, Schnädelbach et al., Proceedings, 6th International Space Syntax Symposium, •stanbul, 2007, pp. 1-14.

*Primary Examiner* — Nicholas Augustine
(74) *Attorney, Agent, or Firm* — Ditthavong Mori & Steiner, P.C.

(57) ABSTRACT

An approach is provided for displaying interactive preview information in a location-based user interface. A content mapping platform determines to render, at a device, a user interface for a location-based service based, at least in part, on a field of view. The content mapping platform determines one or more items outside of the field of view and then determines to render one or more user interface objects in the user interface. The one or more user interface objects present, at least in part, preview information associated with the one or more items.

20 Claims, 11 Drawing Sheets

(56) References Cited

U.S. PATENT DOCUMENTS

| | | |
|---|---|---|
| 2008/0033641 A1 | 2/2008 | Medalia |
| 2009/0105933 A1 | 4/2009 | Wlotzka |
| 2009/0177383 A1 | 7/2009 | Tertoolen |
| 2009/0319181 A1 | 12/2009 | Khosravy et al. |
| 2010/0304787 A1* | 12/2010 | Lee et al. .................. 455/556.1 |
| 2010/0325563 A1* | 12/2010 | Goldthwaite et al. ........ 715/757 |
| 2012/0057032 A1* | 3/2012 | Jang et al. .................. 348/207.1 |
| 2012/0105477 A1* | 5/2012 | Park .............................. 345/633 |
| 2012/0122529 A1* | 5/2012 | Lyons .............................. 463/1 |

* cited by examiner

METHOD AND APPARATUS FOR DISPLAYING INTERACTIVE PREVIEW INFORMATION IN A LOCATION-BASED USER INTERFACE

BACKGROUND

Service providers (e.g., wireless, cellular, Internet, content, social network, etc.) and device manufacturers are continually challenged to deliver value and convenience to consumers by, for example, providing compelling network services. One area of interest has been the development of mapping and navigating graphics (e.g., digital maps) and/or images (e.g., 360° panoramic street-level views of various locations and points of interest) augmented with, for instance, navigation tags and location relevant content. Typically, navigation, mapping, and other similar services can display panoramic views, two-dimensional rendered maps, three-dimensional rendered maps, and other location-based user interfaces (e.g., user interfaces rendered to depict real and/or virtual locations). However, as such location-based user interfaces become more complex, service providers and device manufacturers faces significant technical challenges to presenting additional information (e.g., preview information about destinations, locations, or other items not within the current field of view) in location-based user interfaces for efficient access by users.

SOME EXAMPLE EMBODIMENTS

Therefore, there is a need for an approach for interactive preview information in a location-based user interface.

According to one embodiment, a method comprises determining to render, at a device, a user interface for a location-based service based, at least in part, on a field of view. The method also comprises determining one or more items outside of the field of view. The method further comprises determining to render one or more user interface objects in the user interface. The one or more user interface objects present, at least in part, preview information associated with the one or more items.

According to another embodiment, an apparatus comprising at least one processor, and at least one memory including computer program code, the at least one memory and the computer program code configured to, with the at least one processor, cause, at least in part, the apparatus to determine to render, at a device, a user interface for a location-based service based, at least in part, on a field of view. The apparatus is also caused to determine one or more items outside of the field of view. The apparatus is further caused to determine to render one or more user interface objects in the user interface. The one or more user interface objects present, at least in part, preview information associated with the one or more items.

According to another embodiment, a computer-readable storage medium carrying one or more sequences of one or more instructions which, when executed by one or more processors, cause, at least in part, an apparatus to determine to render, at a device, a user interface for a location-based service based, at least in part, on a field of view. The apparatus is also caused to determine one or more items outside of the field of view. The apparatus is further caused to determine to render one or more user interface objects in the user interface. The one or more user interface objects present, at least in part, preview information associated with the one or more items.

According to another embodiment, an apparatus comprises means for determining to render, at a device, a user interface for a location-based service based, at least in part, on a field of view. The apparatus also comprises means for determining one or more items outside of the field of view. The apparatus further comprises means for determining to render one or more user interface objects in the user interface. The one or more user interface objects present, at least in part, preview information associated with the one or more items.

According to another embodiment, a computer program product includes one or more sequences of one or more instructions which, when executed by one or more processors, cause an apparatus to determine to render, at a device, a user interface for a location-based service based, at least in part, on a field of view. The apparatus is also caused to determine one or more items outside of the field of view. The apparatus is further caused to determine to render one or more user interface objects in the user interface. The one or more user interface objects present, at least in part, preview information associated with the one or more items.

According to another embodiment, a method comprises facilitating access to at least one interface configured to allow access to at least one service, the at least one service configured to determine to render, at a device, a user interface for a location-based service based, at least in part, on a field of view. The apparatus is also caused to determine one or more items outside of the field of view. The apparatus is further caused to determine to render one or more user interface objects in the user interface. The one or more user interface objects present, at least in part, preview information associated with the one or more items.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (including derived at least in part from) any one or any combination of methods (or processes) disclosed in this application as relevant to any embodiment of the invention.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings.

DESCRIPTION OF SOME EMBODIMENTS

Examples of a method, apparatus, and computer program for displaying interactive preview information in a location-based user interface are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "image" refers to one or a series of images taken by a camera (e.g., a still camera, digital camera, video camera, camera phone, etc.) or any other imaging equipment. Although various embodiments are described with respect to a live camera view, it is contemplated that the approach described herein may be used with other live or real-time images (e.g., a still image, a live view, a live webcam view, etc.) as long as the image is associated with a location and orientation (e.g., tilt angles, and heading) of the imaging device (e.g., camera) at the time of image capture.

As used herein, the term "perspective view" refers to any view that provides some perspective to an object shown therein, either when shown using 2D or 3D displays, or using 2D or 3D images. Such perspective views can be real-time images (e.g., in an augmented reality setting using a camera of the device), a panoramic image (e.g., a pre-stored panoramic photograph), 3D modeling in virtual reality, or other modified views that attempt to show real or virtual depth to objects or surroundings whether constructed with 2D images or 3D images. In one embodiment, the perspective view spans a particular field of view over an image, area, location, etc.

Figure 1:
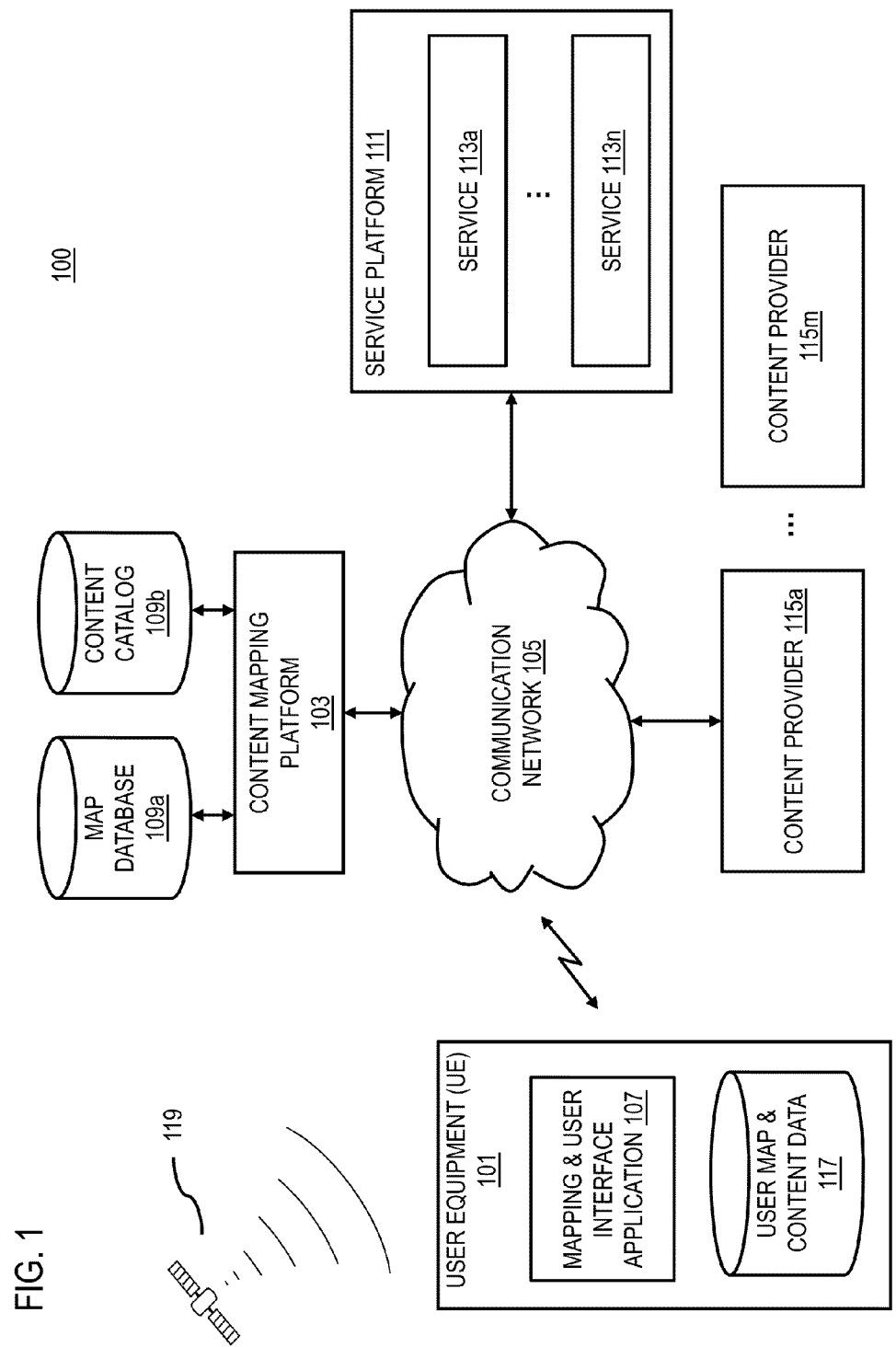
FIG. 1 is a diagram of a system capable of displaying interactive preview information in a location-based user interface, according to one embodiment.

FIG. 1 is a diagram of a system capable of rendering a user interface (UI) for a location-based service that has a main view portion and a preview portion, according to one embodiment. When using a location-based user interface (e.g., a mixed reality view, an augmented reality view, a virtual reality view, and the like), users often desire to quickly jump between locations, items of interests (e.g., points of interests, locations of contacts, event locations, etc.), and the like. However, it can be a problem that switching between locations, items, etc. in a location-based user interface can cause confusion in the understanding of the space and location, especially when the user is not very familiar with the locations depicted in the user interface.

To address this problem, a system 100 of FIG. 1 introduces a capability to render one or more user interface objects that provide preview information about items of interest to a user without altering the main portion of the user interface. In one embodiment, the user interface objects are created to indicate areas, items of interest, etc. that are outside of the field of view of the user interface. For example, if the location-based user interface is a mixed-reality city tour, the user may begin viewing information about the current landmark depicted in the user interface (e.g., an augmented reality interface). The system 100 can then render user interface objects (e.g., depicted as bubbles, vignettes, portals, tunnels, etc.) in a section or a portion of the screen to depict preview information associated with other landmarks. In one embodiment, the system 101 determines an order for rendering and/or presenting the user interface objects based, at least in part, on a relevance of the items corresponding to the user interface objects. For example, the relevance can be based on user interests (e.g., what kind of businesses the user is mostly interested in, what are the most contacted friends, etc.).

In one embodiment, the preview user interface objects are placed in the user interface (e.g., a scene or location represented in the user interface) indicating a direction of the location of the previewed item with respect to a current location or perspective of the user's activity in the user interface. By way of example, the preview user interface objects may also differ in size, color, style, theme, etc. depending on the relative proximity of the previewed items. In one embodiment, the user interface objects may provide preview information to depict the location of the items, content associated with the item (e.g., images, media files, etc. associated with the items), context information (e.g., surrounding imagery at the location of the previewed item, weather conditions at the location, etc.), a portion of the building or structure housing the item, or a combination thereof. In some embodiments, the user interface object may be rendered as an icon, graphic, or other representation of the item or a location of the item, or a representation of the item in its setting.

In one embodiment, display of the preview user interface objects can be disabled and enabled by the system 100, the user, associated application, or other authorized component using manual and/or automated processes. For example, the user can manually specify enabling or disabling of the display of the preview user interface objects by, for instance, selecting a feature icon, making a gesture (e.g., via touch-based input), or in application settings. In addition or alternatively, the previous user interface objects can fade out after a predetermined period of time if the user has not interacted with it. In other embodiments, the preview user interface objects can be made to disappear by, for instance, shaking the user device, dragging the objects outside of the display area.

In another embodiment, the preview user interface objects can also be dragged or moved to areas of the user interface where they do not disturb or hinder viewing of the remaining portions of the user interface. In this way, the preview user interface objects can remain in view as the user continues to interact with other portions of the user interface. In yet another embodiment, the user can drag the preview user interface objects to different areas of the user interface to trigger different actions. For example, the user can drag the user interface objects to areas for adding the object to a favorites list, an action list (e.g., add to a to-do list), etc.

In one embodiment, the preview user interface objects are interactive. For example, the user can select the user interface objects to "jump" to the landmark or item of interest associated with the selected object. In this way, the user can preview or obtain a remote view of other landmarks to consider, for instance, whether it is worthwhile to visit there or get more information about it. In other words, on selecting a preview user interface object, the system 100 can "jump" to the location or item associated with the object by, for instance, re-rendering the user interface to depict the previewed location or item and then orienting the user interface to show a field of view encompassing the particular direction of the item in the preview. By way of example, the preview user interface object can be rendered and stylized so that the object appears to be a view through a portal, tunnel, window, etc. from the current location to the locations represented by the preview user interface objects.

In one embodiment, the links or jumps between the current location of the user interface and one or more of the locations represented by the preview user interface objects can be created and placed in the user interface by the user, service provider, network operator, or other authorized entity. In one embodiment, the links can be bi-directional, so that creating a link from point A to point B automatically creates a reverse link (and corresponding reverse preview user interface object) from point B to point A. In another embodiment, the user can specify one or more criteria for automatically creating the links. For example, the user can define criteria or rules to automatically create a link between a starting location and a destination of a navigation application. In another example, the user can automatically create links from the user's current location to the locations of favorite contacts, friends, family members, etc. for display in a location-based user interface. In this way, the preview user interface objects can provide a portal to view the location of the contacts, etc.

In one embodiment, the user interface objects can be animated to represent movement coming from the direction where the item of interest or remote view is situated with respect to the current field of view depicted in the user interface. By way of example, the animation can be started from a non-occluded area (e.g., an area not obscured by other objects such as buildings, terrain, landmarks, etc.) to avoid mixing or confusion with other objects (e.g., buildings) already rendered in the location-based user interface. It is contemplated that any type of animation or rendering can be used to enhance the visibility of the preview user interface objects without overly obscuring other objects. For example, the animation may depict the user interface objects originating from behind buildings, flying into view for outside the current field of view, etc. In another embodiment, occlusions between the preview user interface objects and/or the items of interest they represent and other objects can be determined based, at least in part, on for example building models, terrain maps, pre-calculated occlusion models, elevation maps, etc. The system 100 can then render the user interface accordingly.

In one embodiment, the location-based user interface can be a perspective view that is displayed using real-time or substantially real-time images, pre-stored (pre-recorded) images, or the system 100 can retrieve and stitch a prerecorded still image right next to the live image side by side then displays the seamlessly stitched images to the user. To make the switch seamlessly, the system 100 correlates a prerecorded panoramic image rendered at the same tilt angle and directional heading right next to the live image, and displays the correlated prerecorded panoramic image on the screen. In one embodiment, the panoramic image may cover all or substantially all possible tilt angles for a given location. In this way, the system 100 need not stitch or correlate multiple images to cover a range of tilt angles.

However, the existing photo matching technology allows near 100% matching between the live image and the prerecorded panoramic images. There are photo-matching applications (e.g., photo-match online search engines which compare images pixel by pixel) for choosing the best matched panoramic still image for the live image. There are also photo stitching applications which make the boundary between the live image and a prerecorded panoramic still image seamlessly. Alternatively, the user can utilize the user interface to view a remote location. For example, if the user planned to visit a particular POI later in the day, then the user could locate the POI on the plan view of the map (e.g., by scrolling to the location of the POI, entering an address of the POI, searching for the POI using keywords or the name of the POI, etc.), for example, in the main view portion of the user interface. Then, the user can manipulate the orientation representation of the field of view to provide a desired vantage point. For example, if the user planned to travel down a certain road to get to the POI, then the user can manipulate the field of view to provide a vantage point along that road that the user will see while travelling down the road and arriving at the POI. With the field of view set to the desired orientation, then the user can see a preview of the perspective view of the POI in the preview portion of the user interface, and the user can switch the perspective view of the POI to the main view portion of the user interface in order to view an enlarged image of the POI. Thus, the user will be able to see what the POI looks like, thereby allowing the user to recognize the POI upon arrival at the POI later in the day. The perspective view of the POI can also include graphic representations or tags (e.g., bubbles, icons, images, text, etc.) that provide a link to content related to the POI (e.g., name, address, telephone number, weblink, etc.), which can be selected by the user in the user interface in order to obtain further content information regarding the POI.

In one embodiment, the system 100 displays on the screen of the a user device different portions of the prerecorded panoramic view depending upon the tilt angle and directional heading of the UE 101 as tilted and/or rotated by the user. In this embodiment, the user can change the prerecorded panoramic image in the prerecorded panoramic view, without moving/dragging a viewing tag on the screen of the user device.

In another embodiment, the system 100 further utilizes the augmented reality or augmented virtual reality (e.g., using 3D models and 3D mapping information) to insert rich content information relevant to the POI (e.g., drawn from the Internet, user inputs, etc.) in the live image view in a real time manner. Tags are displayed on a surface of the object or POI and virtually affixed thereto in the perspective view, and shown in a fixed 3D orientation on the surface of the object or POI. In other embodiments, the tags may be rendered to float on a fixed location with the perspective view, but oriented towards the user or camera to make the tags more visible. The content relevant to the POI can also be seen in the prerecorded panoramic view, and the contact may be already embedded/tagged in the prerecorded panoramic view, or inserted in a real time manner. The POIs can be pre-set by users, service providers (e.g., wireless, cellular, Internet, content, social network, etc.), and/or device manufacturers, and the relevant content can be embedded/tagged by any one of a combination of these entities as well. This content can then be displayed as preview information in the one or more preview user interface objects.

By way of example, the user selects a POI or a section of the POI (e.g., a particular floor or floors of the POI), and tags content information associated with the POI (e.g., content information retrieved from a website or other network source). The system 100 saves the POI and the tagged content, and presents to the user most updated content information in the live image view and/or the prerecorded panoramic view, automatically or on demand. By way of example, the content information may include: (1) a floor plan of the POI, (2) the occupants/shops/facilities located in the POI (e.g., in thumbnail images, animation, audio alerts, etc.), (3) introduction and background content with respect to the occupants/shops/facilities, (4) marketing and sales content with respect to the occupants/shops/facilities, (5) user-generated notes, or any other data or information tied to the POI. It is also contemplated that content may be associated with multiple floors or multiple POIs. In one embodiment, the content information includes live media, stored media, metadata associated with media, text information, location information of other user devices, mapping data, geo-tagged data, or a combination thereof.

As shown in FIG. 1, the system 100 comprises at least one user equipment (UE) 101 that may retrieve content information (e.g., content and location information) and mapping information (e.g., maps, GPS data, prerecorded panoramic views, etc.) from a content mapping platform 103 via a communication network 105. The content and mapping information can be used by a mapping and user interface application 107 on the UE 101 (e.g., an augmented reality application, navigation application, or other location-based application) to generate a location-based user interface with one or more preview user interface objects as discussed with respect to various embodiments of the approach described herein. In the example of FIG. 1, the content mapping platform 103 stores mapping information in the map database 109a and content information in the content catalog 109b. By way of example, mapping information includes digital maps, GPS coordinates, prerecorded panoramic views, geo-tagged data, points of interest data, or a combination thereof. By way of example, content information includes one or more identifiers, metadata, access addresses (e.g., network address such as a Uniform Resource Locator (URL) or an Internet Protocol (IP) address; or a local address such as a file or storage location in a memory of the UE 101, description, or the like associated with content. In one embodiment, content includes live media (e.g., streaming broadcasts), stored media (e.g., stored on a network or locally), metadata associated with media, text information, location information of other user devices, or a combination thereof. The content may be provided by the service platform 111 which includes one or more services 113a-113n (e.g., music service, mapping service, video service, social networking service, content broadcasting service, etc.), the one or more content providers 115a-115m (e.g., online content retailers, public databases, etc.), other content source available or accessible over the communication network 105.

Additionally or alternatively, in certain embodiments, a user map and content database 117 of the UE 101 may be utilized in conjunction with the application 107 to present content information, location information (e.g., mapping and navigation information), availability information, etc. to the user. The user may be presented with an augmented reality interface associated with the application 107 and/or the content mapping platform 103 allowing 3D objects or other representations of content and related information to be superimposed onto an image of a physical environment on the UE 101. In certain embodiments, the user interface may display a hybrid physical and virtual environment where 3D objects from the map database 109a are superimposed on top of a physical image.

By way of example, the UE 101 may execute the application 107 to receive content and/or mapping information from the content mapping platform 103 or other component of the network 105. As mentioned above, the UE 101 utilizes GPS satellites 119 to determine the location of the UE 101 to utilize the content mapping functions of the content mapping platform 103 and/or the application 107, and the map information stored in the map database 109a may be created from live camera views of real-world buildings and other sites. As such, content can be augmented into prerecorded panoramic views and/or live camera views of real world locations (e.g., based on location coordinates such as global positioning system (GPS) coordinates). In one embodiment, the content can also be presented as preview information in one or more preview user interface objects.

By way of example, the application 107 and the content mapping platform 103 receive access information about content, determines the availability of the content based on the access information, and then presents a prerecorded panoramic view or a live image view with augmented content (e.g., a live camera view of a building augmented with related content, such as the building's origin, facilities information: height, a number of floor, etc.). In certain embodiments, the content information may include 2D and 3D digital maps of objects, facilities, and structures in a physical environment (e.g., buildings).

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.).

By way of example, the UE 101, and content mapping platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

In one embodiment, the application 107 and the content mapping platform 103 may interact according to a client-server model, so that the application 107 of the UE 101 requests mapping and/or content data from the content mapping platform 103 on demand. According to the client-server model, a client process sends a message including a request to a server process, and the server process responds by providing a service (e.g., providing map information). The server process may also return a message with a response to the client process. Often the client process and server process execute on different computer devices, called hosts, and communicate via a network using one or more protocols for network communications. The term "server" is conventionally used to refer to the process that provides the service, or the host computer on which the process operates. Similarly, the term "client" is conventionally used to refer to the process that makes the request, or the host computer on which the process operates. As used herein, the terms "client" and "server" refer to the processes, rather than the host computers, unless otherwise clear from the context. In addition, the process performed by a server can be broken up to run as multiple processes on multiple hosts (sometimes called tiers) for reasons that include reliability, scalability, and redundancy, among others.

Figure 2:
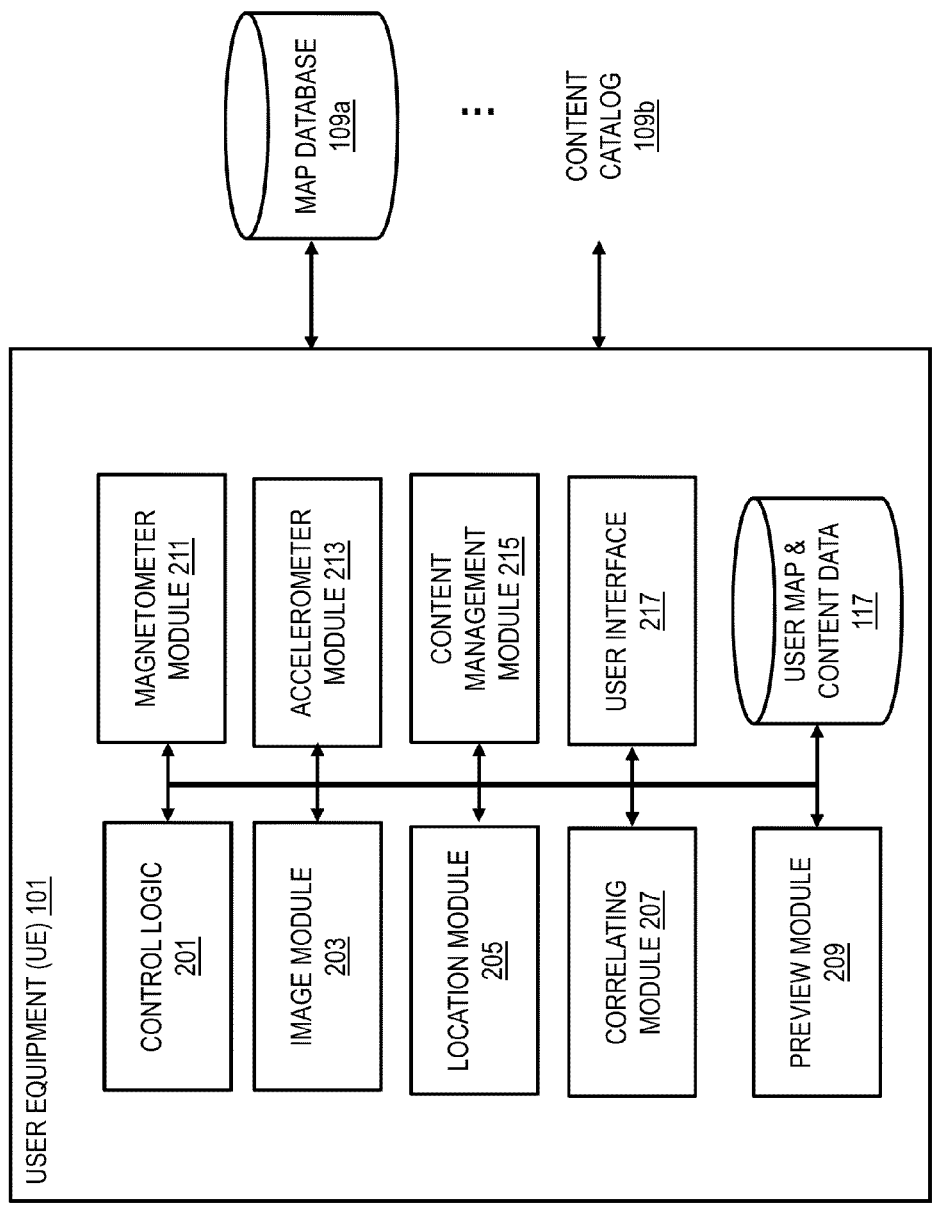
FIG. 2 is a diagram of the components of a mapping and user interface application, according to one embodiment.

FIG. 2 is a diagram of the components of a mapping and user interface application, according to one embodiment. By way of example, the mapping and user interface application 107 includes one or more components to generate a location-based user interface to, for instance, correlate and navigate between a live camera image and a prerecorded panoramic image. The mapping and user interface application 107 also includes the capability to render and present one or more user interface objects for presenting preview information about one or more items outside the field of view or scope of the perspective view of the main user interface. It is contemplated that the functions of these components may be combined in one or more components or performed by other components of equivalent functionality. In this embodiment, the mapping and user interface application 107 includes at least a control logic 201 which executes at least one algorithm for executing functions of the mapping and user interface application 107. For example, the control logic 201 interacts with an image module 203 to provide to a user a live camera view of the surrounding of a current location of the UE 101. The image module 203 may include a camera, a video camera, a combination thereof, etc. In one embodiment, visual media is captured in the form of an image or a series of images. It is also contemplated that the image module 203 may provide the capability to generate remote perspective views of locations other than the current location of the UE 101. In this case, the image module 203 can generate the view based on any location specified by the UE 101 or a user of the UE 101.

Next, the control logic 201 interacts with a location module 205 to retrieve location data of the current location of the UE 101 or another specified location. In one embodiment, the location data may include addresses, geographic coordinates (e.g., GPS coordinates) or other indicators (e.g., longitude and latitude information) that can be associated with the current or specified location. For example, the location data may be manually entered by the user (e.g., entering an address or title, clicking on a digital map, etc.) or extracted or derived from any geo-tagged data. It is contemplated that the location data or geo-tagged data could also be created by the location module 205 by deriving the location associated metadata such as media titles, tags, and comments. More specifically, the location module 205 can parse the metadata for any terms that indicate association with a particular location.

In one embodiment, the location module 205 determines the user's location by a triangulation system such as a GPS, assisted GPS (A-GPS), Differential GPS (DGPS), Cell of Origin, wireless local area network triangulation, or other location extrapolation technologies. Standard GPS and A-GPS systems can use satellites 119 to pinpoint the location (e.g., longitude, latitude, and altitude) of the UE 101. A Cell of Origin system can be used to determine the cellular tower that a cellular UE 101 is synchronized with. This information provides a coarse location of the UE 101 because the cellular tower can have a unique cellular identifier (cell-ID) that can be geographically mapped. The location module 205 may also utilize multiple technologies to detect the location of the UE 101. GPS coordinates can provide finer detail as to the location of the UE 101. As previously noted, the location module 205 may be utilized to determine location coordinates for use by the application 107 and/or the content mapping platform 103.

Again, the control logic 201 interacts with the image module 203 to display the live camera view or perspective view of the current or specified location. While displaying the perspective view of the current or specified location, the control logic 201 interacts with the image module 203 to receive an indication of switching views by the user by, for example, touching a "Switch" icon on the screen of the UE 101. The control logic 201 interacts with a correlating module 207 to correlate the live image view with a prerecorded panoramic view with the location data, and also interacts with a preview module 209 to alternate/switch the display from the live image view to one or more preview user interface objects in the user interface or perspective view. Also, the preview module 209 can control the switching between which view (e.g., a view of the previewed item or location, or a view of the current or specified location) is shown in the main view portion of the user interface 217, and which view is shown in the preview portion (e.g., one or more preview user interface objects) of the user interface 217.

In another embodiment, the image module 203 and/or the preview module 209 interacts with a magnetometer module 211 which determines horizontal orientation or directional heading (e.g., a compass heading) of the UE 101, and an accelerometer module 213 which determines vertical orientation or an angle of elevation of the UE 101. Thereafter, the image module 203 to display on the screen of the UE 101 different portions of the prerecorded panoramic view or perspective view depending upon the tilt angle and directional heading of the UE 101 as tilted and/or rotated by the user. Under these circumstances, the user can view different portions of the prerecorded panoramic view, without moving/dragging a viewing tag on the screen of the UE 101.

In one embodiment, horizontal directional data obtained from a magnetometer is utilized to determine the orientation of the UE 101. The magnetometer module 211 can include an instrument that can measure the strength and/or direction of a magnetic field. Using the same approach as a compass, the magnetometer is capable of determining the directional heading of a UE 101 using the magnetic field of the Earth. The front of the image capture device (e.g., a digital camera) (or another reference point on the UE 101) can be marked as a reference point in determining direction. Thus, if the magnetic field points north compared to the reference point, the angle the UE 101 reference point is from the magnetic field is known. Simple calculations can be made to determine the direction of the UE 101. This directional information may be correlated with the location information of the UE 101 to determine where (e.g., at which geographic feature or object) the UE 101 is pointing towards. This information may be utilized to select a portion of the prerecorded panoramic view to render to the user.

Further, the accelerometer module 213 may include an instrument that can measure acceleration. Using a three-axis accelerometer, with axes X, Y, and Z, provides the acceleration in three directions with known angles. Once again, the front of a media capture device can be marked as a reference point in determining direction. Because the acceleration due to gravity is known, when a UE 101 is stationary, the accelerometer module 213 can determine the angle the UE 101 is pointed as compared to Earth's gravity. In one embodiment, vertical directional data obtained from an accelerometer is used to determine the angle of elevation or tilt angle at which the UE 101 is pointing. This information in conjunction with the magnetometer information and location information may be utilized to determine a viewpoint in the prerecorded panoramic view to the user. As such, this information may be utilized in selecting available content items to present navigational information to the user. Moreover, the combined information may be utilized to determine portions of a particular digital map or a prerecorded panoramic view that may interest the user.

The control logic then interacts with the image module 203 to render a viewpoint in the perspective view (e.g., a prerecorded or rendered panoramic view) to the user, whenever the user rotates/tilts the UE 101. As mentioned, the correlating module 207 can obtain live images from a camera and correlate the live images with a prerecorded panoramic view via location information. In addition, the correlating module 207 uses magnetometer information, accelerometer information, computer vision techniques, or a combination thereof to determine a viewpoint to display a portion of the prerecorded panoramic view to the user.

The control logic 201 then interacts with a content management module 215 and the image module 203 to augment content information related to one or more points of interest (POIs) or items in the live image. By way of example, the content may be received from the service platform 111, the services 113a-113n, the content providers 115a-115m, other like components, or a combination thereof. It is also contemplated that the user or another party authorized by the user may manually enter a content item. In one embodiment, the content management module 215 may create a content catalog listing all content items and associated access addresses provided to the content management module 215. In certain embodiments, the content catalog may include additional descriptive information and other metadata describing the content. The available media content or stream can take many forms (e.g., live video feeds, photographs, audio files, etc.) and can be delivered using any number means (e.g., streaming media, downloaded media, spontaneously created media, etc.). The content management module 215 includes one or more sub-modules or application programming interfaces (APIs) (not pictured) for receiving and/or detecting the media content in its native format or for converting the media content to a media format compatible with the mapping and user interface application 107. In other embodiments, the content management module 215 may initiate a download or installation of the components (e.g., codecs, player applications, etc.) needed to verify the content or stream. The content data can be cached or save in the user map and content database 117. In one embodiment, the content can be used by the one or more preview user interface objects to provide preview information one or more items (e.g., POIs) outside of the current field of view.

To facilitate finding specific content or features, the content management module 215 enables the user to input search criteria (e.g., a content item, person, city, weather, etc.) and to get guidance for finding the direction where the searched content item is located in the real physical world. The content management module 215 also enables a user to specify a time period so as to navigate content information using both location and time. In one embodiment, the default time for viewing the content and mapping information is the present. If a time period is set as future, the content management module 215 will determine the one or more content items based on the specified time, such as what will be on sale in the next three hours in a department store.

In one embodiment, the content can be depicted as a thumbnail overlaid on the user interface map at the location corresponding to a point of interest (e.g., a floor) or a portion of the point of interest (e.g., facilities on the floor), affixed to the POI at a fixed 3D orientation, or presented in any available portion of the user interface. As discussed, the user interface may be a graphical user interface. In addition or alternatively, the user interface may be an audio or tactile interface. In one embodiment, the content management module 215 presents only those content items that are available at the specified time and are not associated with any limitations or exclusive restrictions. This embodiment provides a user experience in which users can simply select from the presented content items and be assured that the selected item will be available with a single selection click. In other embodiments, the content management module 215 may present all available content and differentiate the presentation of content available with a single click versus content associated with additional limitations or restrictions. The specific types of presentations can be specified by the user, content provider 115, network operator, service platform 111, or a combination thereof. The content management module 215 then determines whether to periodically update the content information.

In certain embodiments, when there is more content available than can be displayed in the existing user interface, the content management module 215 constantly animates the display of the content items so that new content keeps appearing while older content disappears. This animation process also makes the user interface more entertaining to users and gives a feeling of the world being "alive" with activity. The animated items could appear in order of relevance to the user, or in time order, or in a certain predefined order based on categories and other methods to determine interests.

In certain embodiments, the user map and content database 117 includes all or a portion of the information in the map database 109a and the content catalog 109b. From the selected viewpoint, a live image view augmented with the content can be provided on the screen of the UE 101. In certain embodiments, the content management module 215 provides a correlated prerecorded panoramic view from the selected view point with content generated or retrieved from the database 117 or the content mapping platform 103. The content information can be embedded/tagged in the correlated prerecorded panoramic view previously by another apparatus or by the content management module 215 on demand and/or in a real time manner when displays the correlated prerecorded panoramic view on the screen of the UE 101.

Content and mapping information may be presented to the user via a user interface 217, which may include various methods of communication. For example, the user interface 217 can have outputs including a visual component (e.g., a screen), an audio component (e.g., a verbal instructions), a physical component (e.g., vibrations), and other methods of communication. User inputs can include a touch-screen interface, microphone, camera, a scroll-and-click interface, a button interface, etc. Further, the user may input a request to start the application 107 (e.g., a mapping and user interface application) and utilize the user interface 217 to receive content and mapping information. Through the user interface 217, the user may request different types of content, mapping, or location information to be presented. Further, the user may be presented with 3D or augmented reality representations of particular locations and related objects (e.g., buildings, terrain features, POIs, etc. at the particular location) as part of a graphical user interface on a screen of the UE 101. As mentioned, the UE 101 communicates with the content mapping platform 103, service platform 111, and/or content providers 115a-115m to fetch content, mapping, and or location information. The UE 101 may utilize requests in a client server format to retrieve the content and mapping information. Moreover, the UE 101 may specify location information and/or orientation information in the request to retrieve the content and mapping information.

Figure 3:
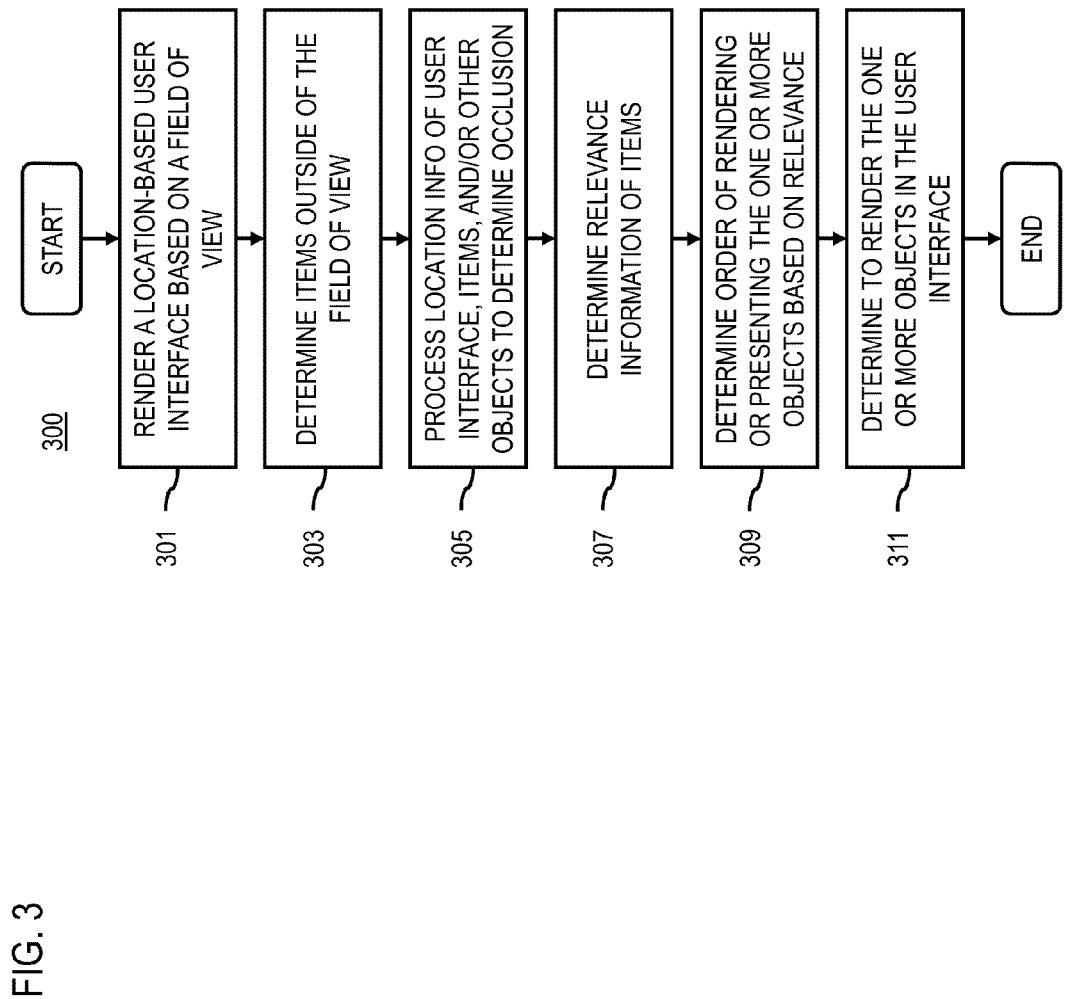
FIG. 3 is a flowchart of a process for displaying interactive preview information in a location-based user interface, according to one embodiment.

FIG. 3 is a flowchart of a process for displaying interactive preview information in a location-based user interface, according to one embodiment. In one embodiment, the mapping and user interface application 107 performs the process 300 and is implemented in, for instance, a chip set including a processor and a memory as shown FIG. 7. In addition or alternatively, the content mapping platform 103 may perform all or a portion of the process 300.

In step 301, the mapping and user interface application 107 determines to render, at a device (e.g., the UE 101), a user interface for a location-based service based, at least in part, on a field of view. By way of example, the field of view may be specified by the device or determined from one or more sensors of the UE 101 to detect, for instance, the location, heading, and tilt angle of the UE 101. As described previously, the location, heading, and tilt angle can be used to calculate a perspective or field of view for rendering the location-based user interface. In one embodiment, the location-based user interface depicts, at least in part, a mixed reality view, an augmented reality view, an augmented virtual reality view, a panorama, or a combination thereof.

Next, the mapping and user interface application 107 determines one or more items that are outside of the field of view of the currently displayed user interface (step 305). By way of example, the one or more items include, at least in part, points of interest, location of contacts associated with the UE 101, appointment locations, event locations, user-generated notes, or a combination thereof. In other words, the items that can be determined in this step can include any item that is associated with location information for correlation to the location-based user interface. As used herein, "outside the field of view" refers to a location of the item that is outside the area or perspective view rendered in the current display. It is contemplated that the items may be anywhere from just outside the current user interface's field of view or scope to remote distances from the current or specified location of the rendered user interface.

In one embodiment, the mapping and user interface application 107 processes and/or facilitates a processing of location information associated with the one or more items to determine occlusion information with respect to one or more other objects of the user interface, the location-based service, or a combination thereof (step 307). For example, the application 107 can determine whether the item (e.g., a contact location or POI) is located within or behind one or more buildings so that the item would not be visible from the current perspective of the user interface. Based, at least in part, on the occlusion information, the application 107 can apply different rendering techniques for one or more preview user interface objects used to represent the items in the rendered user interface.

In one embodiment, the application 107 can determine to render the one or more preview user interface objects to indicate, at least in part, a direction of the one or more items based, at least in part, on the occlusion information. In another embodiment, the application 107 can determine to render the one or more objects on, near, or so as to avoid occluding one or more other objects based, at in part, on the occlusion information. For example, if an item previewed in a user interface object is located behind a building, the user interface object can be rendered to indicate the location (e.g., by animating the object to appear from behind the building, changing the size of the object depending on proximity, etc.). Similarly, if the object is one direction from the rendered user interface, the object can indicate the direction pointing to the actual location of the object.

In certain embodiments, the mapping and user interface application 107 can determine relevance information associated with the one or more items (step 307). By way of example, the relevance information determines, at least in part, the degree to which the one or more items meet user preferences or interests. For example, if the user has a high interest in shopping, then items or POIs related to shopping can have higher relevance; or in the case of contacts, those contacts with whom the user communicates most often can have higher relevance. It is contemplated that the application 107 can use any means to determine the relevance information. The application 107 can the process and/or facilitate a processing of the relevance information to determine an order for rendering or presenting the one or more objects in the user interface (step 309).

Finally, the mapping and user interface application 107 can determine render the one or more user interface objects in the location-based user interface, wherein the one or more user interface objects present, at least in part, preview information associated with the one or more items (step 311). As noted above, the user interface objects can be rendered in a stylized manner as bubbles, portals, tunnels, etc. that depict preview information about the one or more items. In one embodiment, the preview information includes, at least in part, one or more representations of the one or more items (e.g., icons, images, videos, audio clips, etc.), one or more representations of location information associated with the one or more items (e.g., a mixed reality view, 3D model, etc.), content information associated with the one or more items (e.g., articles, documents, etc.), or a combination thereof.

In one embodiment, the user interface objects and/or related preview information can be overlaid or otherwise rendered in a perspective view of the location-based user interface. For example, when generating the perspective view, the mapping and user interface application 107 determines an optimal image of the one or more objects for the perspective view from real-time images and/or pre-stored images. For example, the application 107 can compare various stored images of the particular field of view, and determine which image is in the best focus, at the best vantage point (e.g., closest vantage point to the field of view selected by the user), and then utilize the best image available. Then, the application can cause, at least in part, rendering of the perspective view in the user interface using the optimal image. Additionally, it is noted that the perspective view can be formed by providing smooth transitions between real-time images, pre-stored images, and/or a mix of the real-time images and the pre-stored images with the graphic representation overlaid onto the surface of the object in order to provide the best possible perspective view in a smooth and continuous manner.

Also, it should be noted that when the application 107 receives input changing the orientation of the display, then the application 107 may simultaneously change the orientation of the display of the perspective view and the one or more preview user interface objects in correspondence to the input. Thus, any change in one view will simultaneously result in a change in the other view if appropriate.

Figure 4:
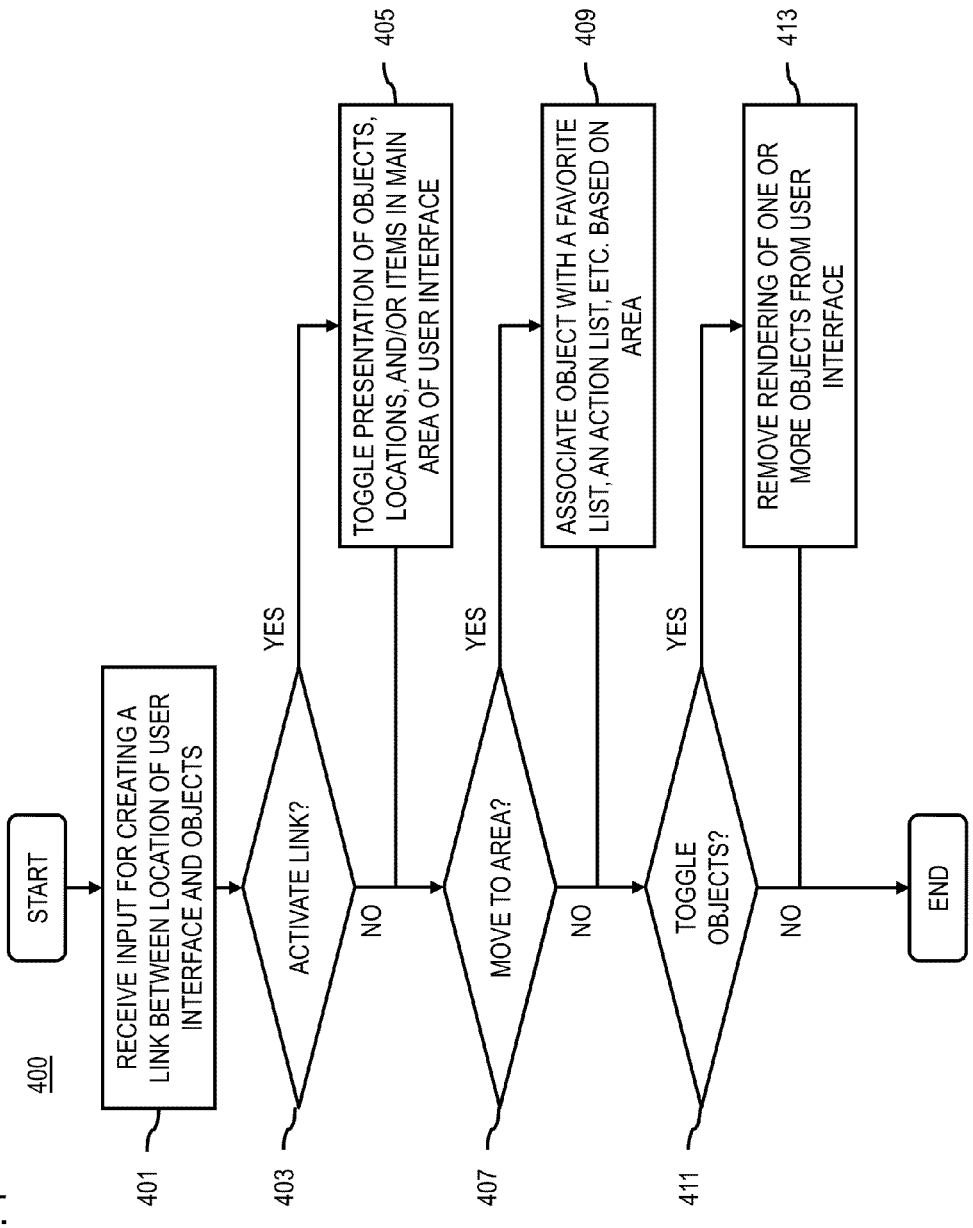
FIG. 4 is a flowchart of a process for interacting with preview information in a location-based user interface, according to one embodiment.
Figure 7:
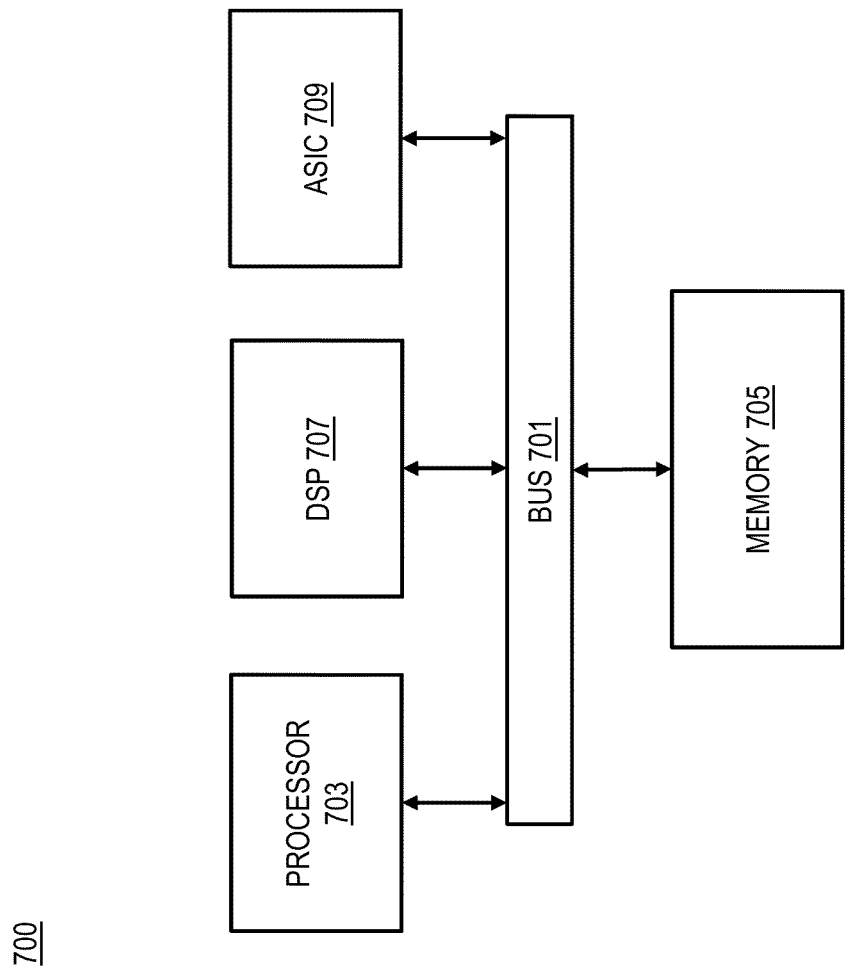
FIG. 7 is a diagram of a chip set that can be used to implement an embodiment of the invention.

FIG. 4 is a flowchart of a process for interacting with preview information in a location-based user interface, according to one embodiment. The process 400 of FIG. 4 assumes that the process 300 of FIG. 3 has been performed to generate a location-based user interface including one or more preview user interface objects. In one embodiment, the mapping and user interface application 107 performs the process 400 and is implemented in, for instance, a chip set including a processor and a memory as shown in FIG. 7. In addition or alternatively, the content mapping platform 103 may perform all or a portion of the process 400.

In step 401, the mapping and user interface application 107 receives an input for creating a link between a location associated with the user interface and one or more other locations associated with the one or more user interface objects, the one or more items, or a combination thereof. As previously described, a user, service provider, etc. can establish a link among the location of the user interface and the one or more locations of the previewed items. The link enables the user to quickly jump from the rendering of one location to the previewed location and back again in the user interface.

For example, if the link or object is activated or selected (step 403), the mapping and user interface application 107 toggles presentation of the one or more user interface objects, the one or more other locations, the one or more items, or a combination thereof in at least a portion of the user interface (step 405). In other words, the previewed item in the selected user interface object replaces the location rendered in the location-based user interface. The replaced location is then rendered in a preview user interface object rendered over the newly rendered user interface.

In one embodiment, the mapping and user interface application 107 determines whether the one or more preview user interface objects are moved to predetermined areas of the user interface (step 407). These predetermined areas are, for instance, associated with a list of favorite objects, a list of objects to act upon, or a combination thereof (step 409). Accordingly, if a user interface object is moved to a particular area then the application 107 can activate the corresponding function such as adding the object to the a list of favorite objects for later recall, or a list of objects to act upon, etc. In one embodiment, the predetermined area may correspond to a temporary or permanent storage area for the object. In this case, if an object is moved to the storage area, the object can persist in the user interface while the user continues to interact with other portions of the location-based user interface. In another embodiment, the predetermined areas of the user interface may include areas that are outside the currently visible or display area. In other words, an object can be moved or dragged off of the screen to delete an object, indicate that an object is not of interest to the user, or perform any other configured action or operation.

In another embodiment, the objects can be enabled or disabled by toggling (step 411). For example, the toggling can be indicated by shaking the UE 101, dragging the objects off the screen, or by using some other gesture or command. The toggling can then cause removal of the rendering of the one or more objects from the user interface (step 413).

Figure 5A:
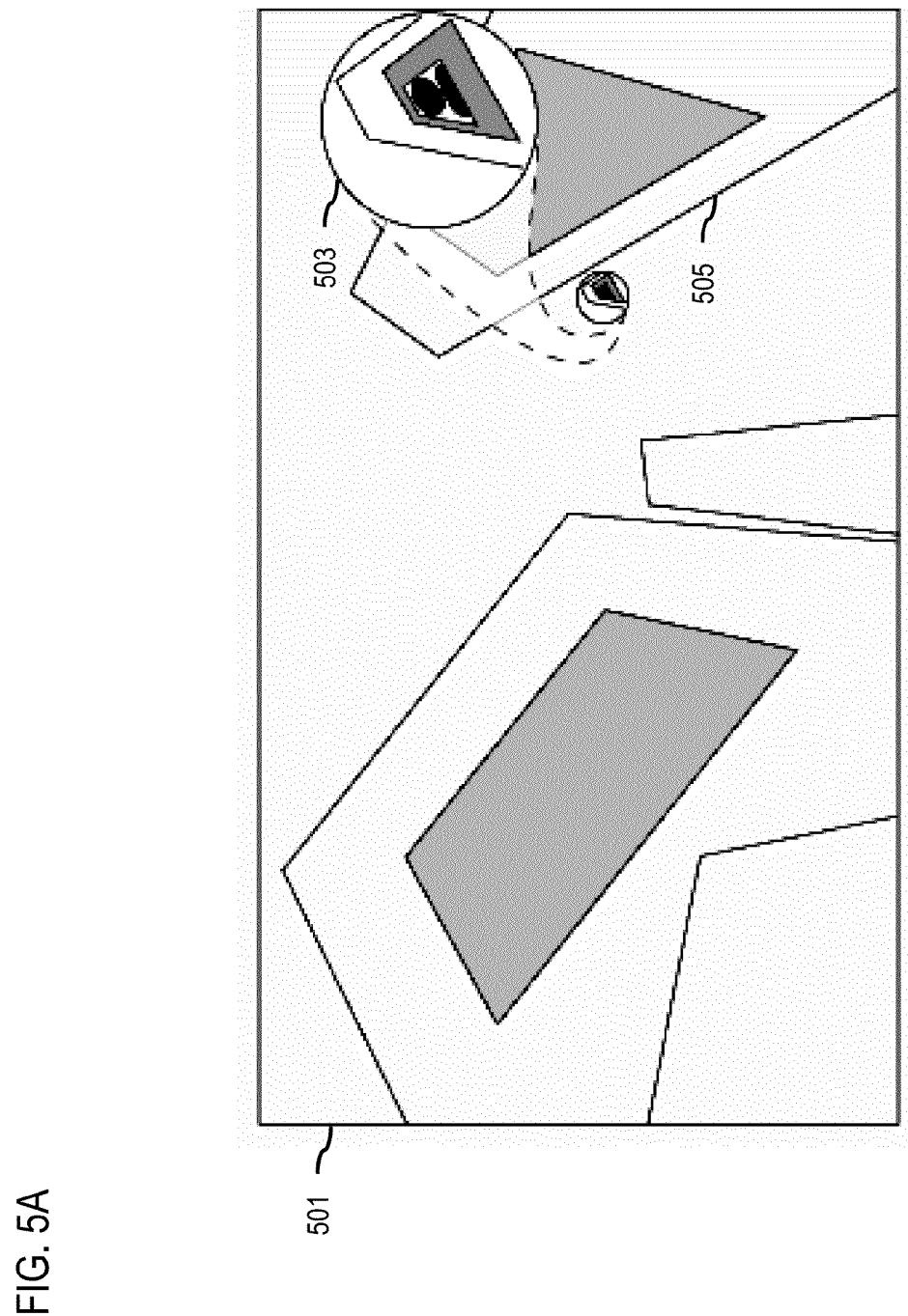
FIGS. 5A-5D are diagrams of user interfaces utilized in the processes of FIGS. 1-4, according to one embodiment.

FIGS. 5A-5D are diagrams of user interfaces utilized in the processes of FIGS. 1-4, according to one embodiment. FIG. 5A depicts a user interface (UI) 501 in which a preview user interface object 503 is rendered as an animation originating from an occluded area obstructed by a building object 505. In this example, the preview user interface object 503 presents preview information (e.g., a picture) of a contact that is currently located within the building 505, thereby occluding a direct view of the contact based on the currently rendered perspective view.

Figure 5B:
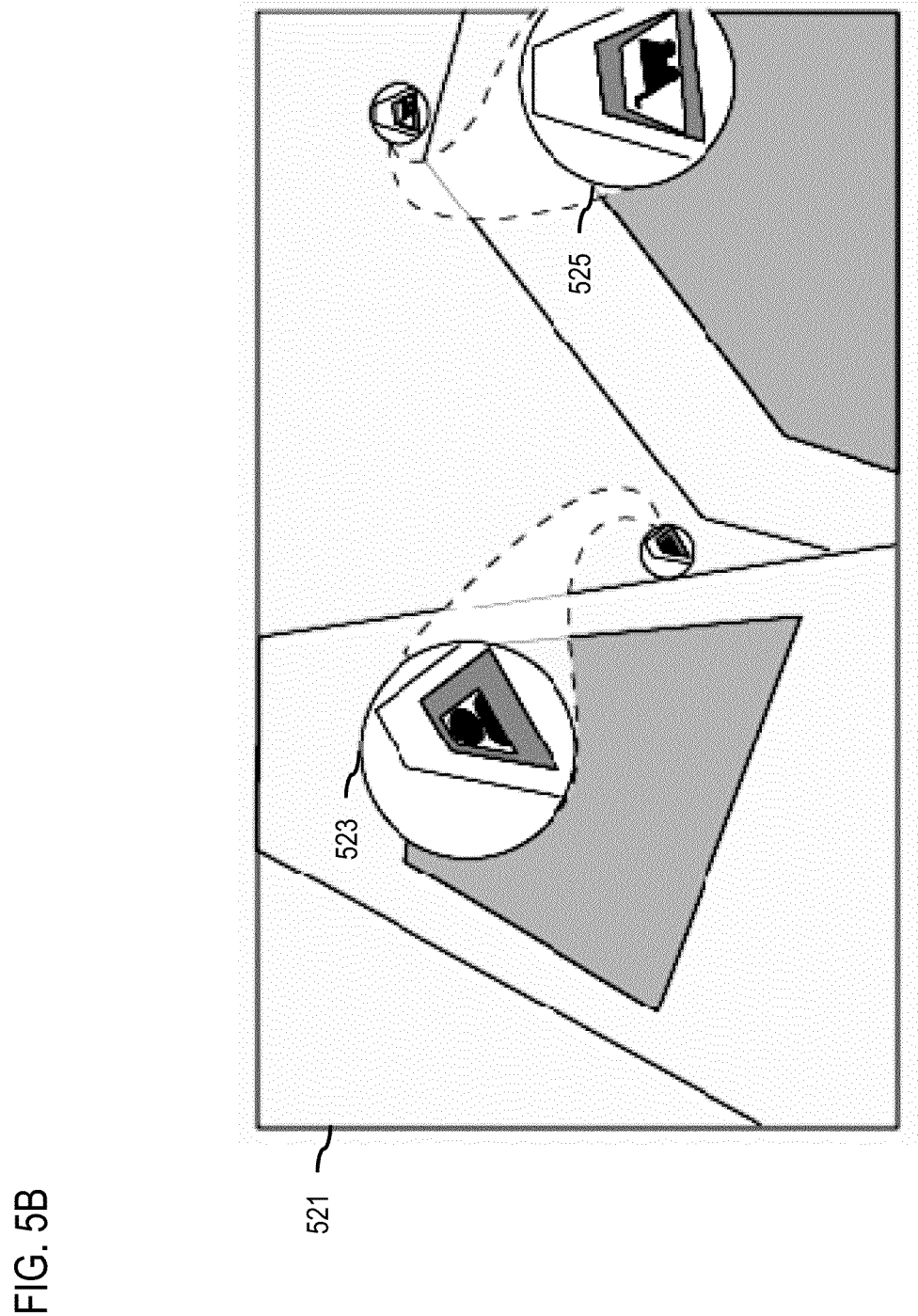

FIG. 5B depicts a UI 521 that includes multiple preview user interface objects (e.g., objects 523 and 525). In this case, both objects are from occluded areas of the UI 521, and are thus animated to indicate origination from the buildings and then placement on the building themselves to indicate an approximate location of the occluded objects 523 and 525.

Figure 5C:
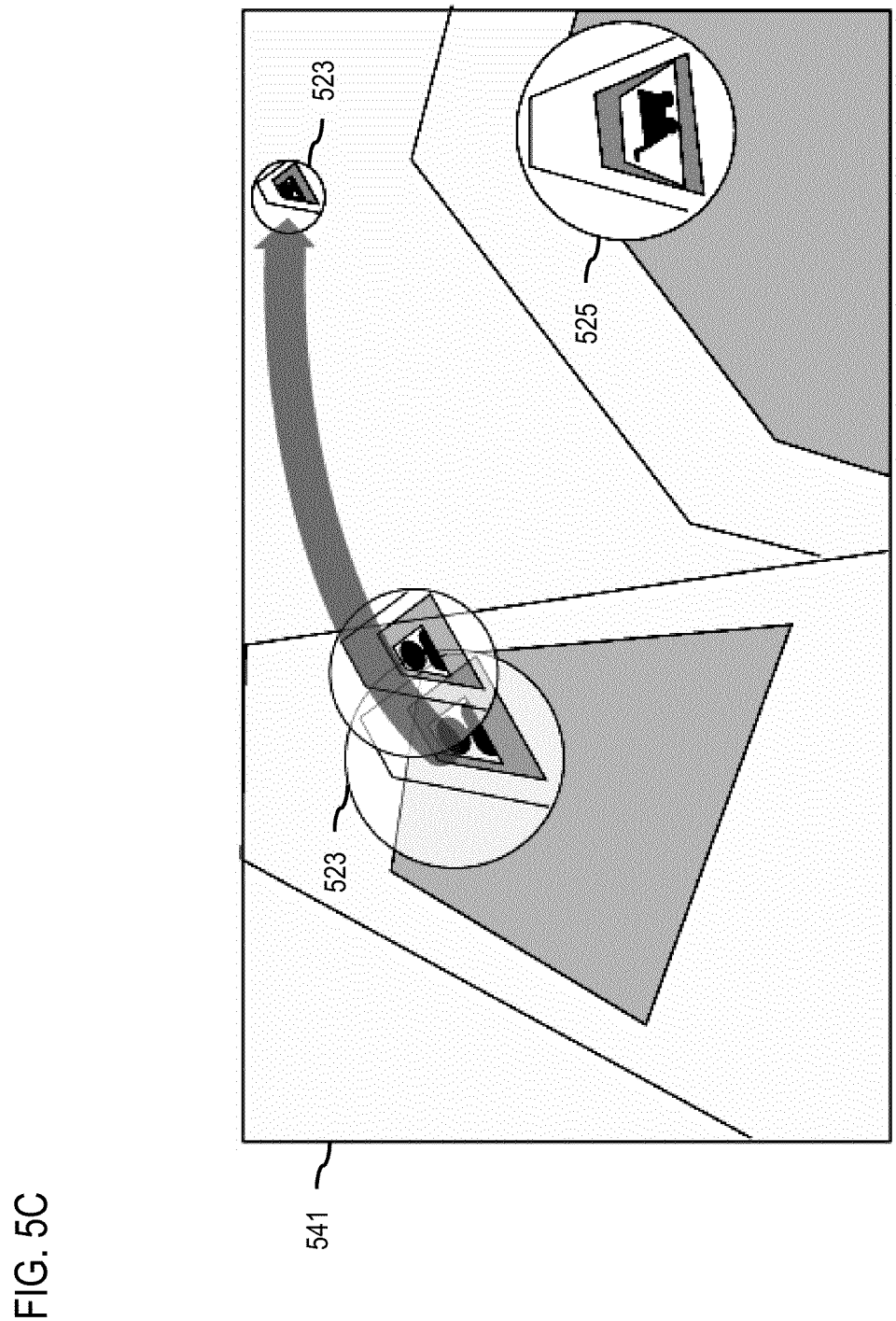

FIG. 5C depicts a UI 541 that is a version of the UI 521 in which the animation of the objects 523 and 525 have been completed so that they are at their final rendered positions on their respective buildings. In one embodiment, to avoid cluttering the user interface, the mapping and user interface application 107 enables the user to drag the objects 523 or 525 to a different area of the user interface. In this example, the user selects to drag the object 523 to another area of the UI 541 where the object 523 remains even if the panorama or mixed reality view of the UI 541 changes. In this way, the user can select the object 523 to remain accessible for later reference without disturbing the current view and/or activities (e.g., navigation) associated with the current view.

Figure 5D:
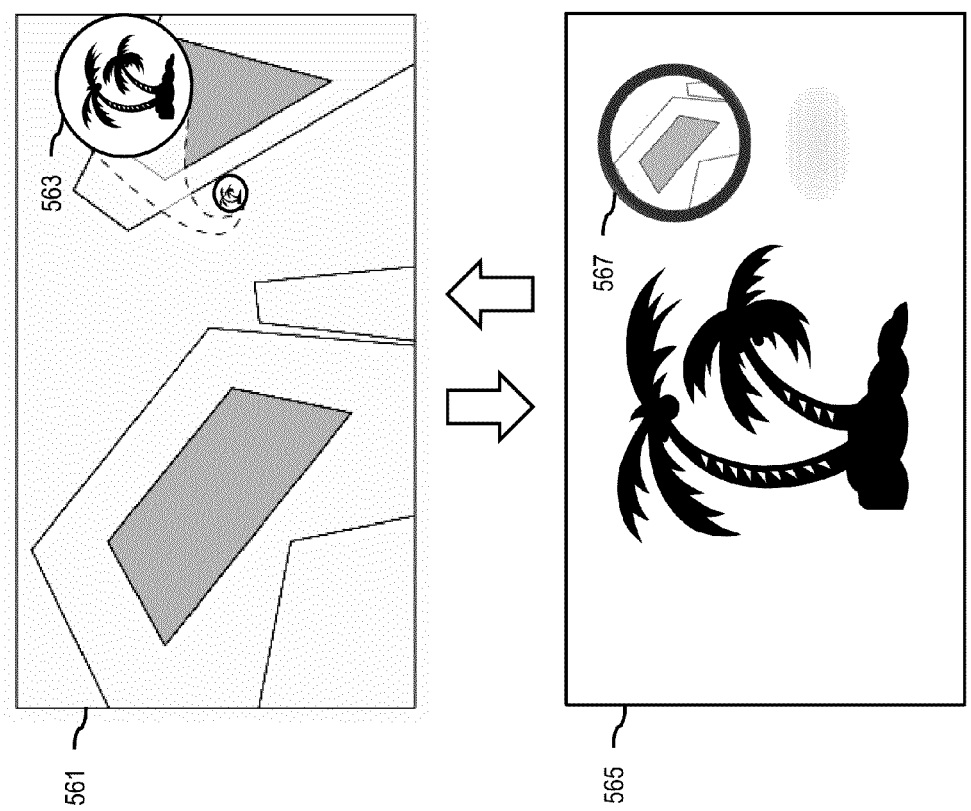

FIG. 5D depicts UI 561 that includes a rendering of a city center in the main perspective view of the UI 561 and a rendering of a user interface object 563 that presents preview information regarding the user's vacation destination (e.g., an island). The preview information of the object 563 is, for instance, a rendering that provides a perspective view of the island. In this example, the user has linked the current city location to the island location of the object 563. Accordingly, on selection or activation of the link associated with the object 563, the mapping and user interface application 107 renders the UI 565 which presents the perspective view of the island location in the main portion of the UI 565 and the city location as a preview user interface object 567. A view of the city center remains visible in the object 567. In addition, because the link between the city location and the island location is bidirectional, the user can select or activate the link associated with the object 567 to return to the UI 561 and restore the rendering of the city location.

The processes described herein for displaying interactive preview information in a location-based user interface may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 6:
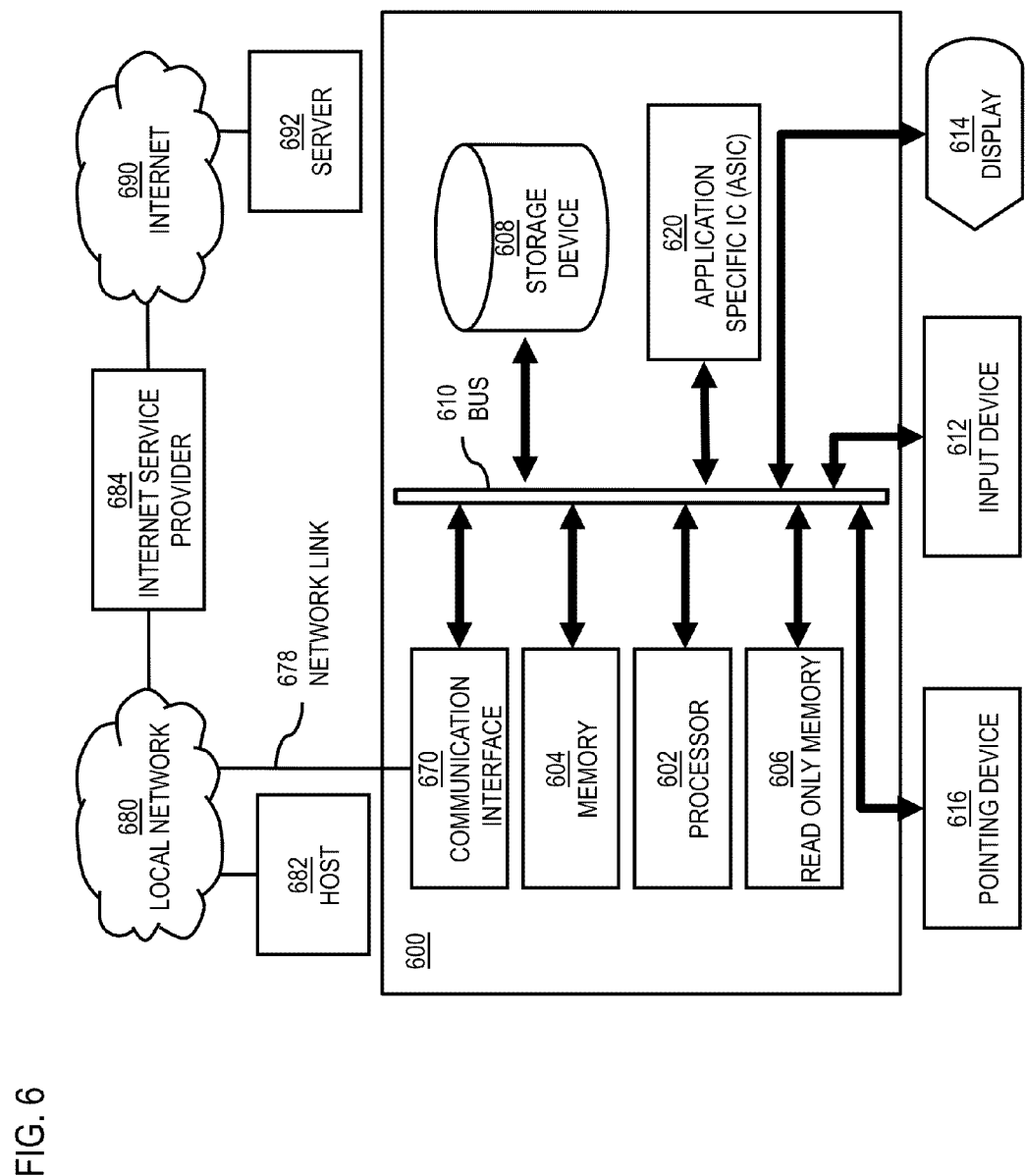
FIG. 6 is a diagram of hardware that can be used to implement an embodiment of the invention.

FIG. 6 illustrates a computer system 600 upon which an embodiment of the invention may be implemented. Although computer system 600 is depicted with respect to a particular device or equipment, it is contemplated that other devices or equipment (e.g., network elements, servers, etc.) within FIG. 6 can deploy the illustrated hardware and components of system 600. Computer system 600 is programmed (e.g., via computer program code or instructions) to display interactive preview information in a location-based user interface as described herein and includes a communication mechanism such as a bus 610 for passing information between other internal and external components of the computer system 600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 600, or a portion thereof, constitutes a means for performing one or more steps of displaying interactive preview information in a location-based user interface.

A bus 610 includes one or more parallel conductors of information so that information is transferred quickly among devices coupled to the bus 610. One or more processors 602 for processing information are coupled with the bus 610.

A processor (or multiple processors) 602 performs a set of operations on information as specified by computer program code related to displaying interactive preview information in a location-based user interface. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 610 and placing information on the bus 610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 600 also includes a memory 604 coupled to bus 610. The memory 604, such as a random access memory (RAM) or any other dynamic storage device, stores information including processor instructions for displaying interactive preview information in a location-based user interface. Dynamic memory allows information stored therein to be changed by the computer system 600. RAM allows a unit of information stored at a location called a memory address to be stored and retrieved independently of information at neighboring addresses. The memory 604 is also used by the processor 602 to store temporary values during execution of processor instructions. The computer system 600 also includes a read only memory (ROM) 606 or any other static storage device coupled to the bus 610 for storing static information, including instructions, that is not changed by the computer system 600. Some memory is composed of volatile storage that loses the information stored thereon when power is lost. Also coupled to bus 610 is a non-volatile (persistent) storage device 608, such as a magnetic disk, optical disk or flash card, for storing information, including instructions, that persists even when the computer system 600 is turned off or otherwise loses power.

Information, including instructions for displaying interactive preview information in a location-based user interface, is provided to the bus 610 for use by the processor from an external input device 612, such as a keyboard containing alphanumeric keys operated by a human user, or a sensor. A sensor detects conditions in its vicinity and transforms those detections into physical expression compatible with the measurable phenomenon used to represent information in computer system 600. Other external devices coupled to bus 610, used primarily for interacting with humans, include a display device 614, such as a cathode ray tube (CRT), a liquid crystal display (LCD), a light emitting diode (LED) display, an organic LED (OLED) display, a plasma screen, or a printer for presenting text or images, and a pointing device 616, such as a mouse, a trackball, cursor direction keys, or a motion sensor, for controlling a position of a small cursor image presented on the display 614 and issuing commands associated with graphical elements presented on the display 614. In some embodiments, for example, in embodiments in which the computer system 600 performs all functions automatically without human input, one or more of external input device 612, display device 614 and pointing device 616 is omitted.

In the illustrated embodiment, special purpose hardware, such as an application specific integrated circuit (ASIC) 620, is coupled to bus 610. The special purpose hardware is configured to perform operations not performed by processor 602 quickly enough for special purposes. Examples of ASICs include graphics accelerator cards for generating images for display 614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 600 also includes one or more instances of a communications interface 670 coupled to bus 610. Communication interface 670 provides a one-way or two-way communication coupling to a variety of external devices that operate with their own processors, such as printers, scanners and external disks. In general the coupling is with a network link 678 that is connected to a local network 680 to which a variety of external devices with their own processors are connected. For example, communication interface 670 may be a parallel port or a serial port or a universal serial bus (USB) port on a personal computer. In some embodiments, communications interface 670 is an integrated services digital network (ISDN) card or a digital subscriber line (DSL) card or a telephone modem that provides an information communication connection to a corresponding type of telephone line. In some embodiments, a communication interface 670 is a cable modem that converts signals on bus 610 into signals for a communication connection over a coaxial cable or into optical signals for a communication connection over a fiber optic cable. As another example, communications interface 670 may be a local area network (LAN) card to provide a data communication connection to a compatible LAN, such as Ethernet. Wireless links may also be implemented. For wireless links, the communications interface 670 sends or receives or both sends and receives electrical, acoustic or electromagnetic signals, including infrared and optical signals, that carry information streams, such as digital data. For example, in wireless handheld devices, such as mobile telephones like cell phones, the communications interface 670 includes a radio band electromagnetic transmitter and receiver called a radio transceiver. In certain embodiments, the communications interface 670 enables connection to the communication network 105 for displaying interactive preview information in a location-based user interface via the UE 101.

The term "computer-readable medium" as used herein refers to any medium that participates in providing information to processor 602, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 608. Volatile media include, for example, dynamic memory 604. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 620.

Network link 678 typically provides information communication using transmission media through one or more networks to other devices that use or process the information. For example, network link 678 may provide a connection through local network 680 to a host computer 682 or to equipment 684 operated by an Internet Service Provider (ISP). ISP equipment 684 in turn provides data communication services through the public, world-wide packet-switching communication network of networks now commonly referred to as the Internet 690.

A computer called a server host 692 connected to the Internet hosts a process that provides a service in response to information received over the Internet. For example, server host 692 hosts a process that provides information representing video data for presentation at display 614. It is contemplated that the components of system 600 can be deployed in various configurations within other computer systems, e.g., host 682 and server 692.

At least some embodiments of the invention are related to the use of computer system 600 for implementing some or all of the techniques described herein. According to one embodiment of the invention, those techniques are performed by computer system 600 in response to processor 602 executing one or more sequences of one or more processor instructions contained in memory 604. Such instructions, also called computer instructions, software and program code, may be read into memory 604 from another computer-readable medium such as storage device 608 or network link 678. Execution of the sequences of instructions contained in memory 604 causes processor 602 to perform one or more of the method steps described herein. In alternative embodiments, hardware, such as ASIC 620, may be used in place of or in combination with software to implement the invention. Thus, embodiments of the invention are not limited to any specific combination of hardware and software, unless otherwise explicitly stated herein.

The signals transmitted over network link 678 and other networks through communications interface 670, carry information to and from computer system 600. Computer system 600 can send and receive information, including program code, through the networks 680, 690 among others, through network link 678 and communications interface 670. In an example using the Internet 690, a server host 692 transmits program code for a particular application, requested by a message sent from computer 600, through Internet 690, ISP equipment 684, local network 680 and communications interface 670. The received code may be executed by processor 602 as it is received, or may be stored in memory 604 or in storage device 608 or any other non-volatile storage for later execution, or both. In this manner, computer system 600 may obtain application program code in the form of signals on a carrier wave.

Various forms of computer readable media may be involved in carrying one or more sequence of instructions or data or both to processor 602 for execution. For example, instructions and data may initially be carried on a magnetic disk of a remote computer such as host 682. The remote computer loads the instructions and data into its dynamic memory and sends the instructions and data over a telephone line using a modem. A modem local to the computer system 600 receives the instructions and data on a telephone line and uses an infra-red transmitter to convert the instructions and data to a signal on an infra-red carrier wave serving as the network link 678. An infrared detector serving as communications interface 670 receives the instructions and data carried in the infrared signal and places information representing the instructions and data onto bus 610. Bus 610 carries the information to memory 604 from which processor 602 retrieves and executes the instructions using some of the data sent with the instructions. The instructions and data received in memory 604 may optionally be stored on storage device 608, either before or after execution by the processor 602.

FIG. 7 illustrates a chip set or chip 700 upon which an embodiment of the invention may be implemented. Chip set 700 is programmed to display interactive preview information in a location-based user interface as described herein and includes, for instance, the processor and memory components described with respect to FIG. 6 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 700 can be implemented in a single chip. It is further contemplated that in certain embodiments the chip set or chip 700 can be implemented as a single "system on a chip." It is further contemplated that in certain embodiments a separate ASIC would not be used, for example, and that all relevant functions as disclosed herein would be performed by a processor or processors. Chip set or chip 700, or a portion thereof, constitutes a means for performing one or more steps of providing user interface navigation information associated with the availability of functions. Chip set or chip 700, or a portion thereof, constitutes a means for performing one or more steps of displaying interactive preview information in a location-based user interface.

In one embodiment, the chip set or chip 700 includes a communication mechanism such as a bus 701 for passing information among the components of the chip set 700. A processor 703 has connectivity to the bus 701 to execute instructions and process information stored in, for example, a memory 705. The processor 703 may include one or more processing cores with each core configured to perform independently. A multi-core processor enables multiprocessing within a single physical package. Examples of a multi-core processor include two, four, eight, or greater numbers of processing cores. Alternatively or in addition, the processor 703 may include one or more microprocessors configured in tandem via the bus 701 to enable independent execution of instructions, pipelining, and multithreading. The processor 703 may also be accompanied with one or more specialized components to perform certain processing functions and tasks such as one or more digital signal processors (DSP) 707, or one or more application-specific integrated circuits (ASIC) 709. A DSP 707 typically is configured to process real-world signals (e.g., sound) in real time independently of the processor 703. Similarly, an ASIC 709 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 700 includes merely one or more processors and some software and/or firmware supporting and/or relating to and/or for the one or more processors.

The processor 703 and accompanying components have connectivity to the memory 705 via the bus 701. The memory 705 includes both dynamic memory (e.g., RAM, magnetic disk, writable optical disk, etc.) and static memory (e.g., ROM, CD-ROM, etc.) for storing executable instructions that when executed perform the inventive steps described herein to display interactive preview information in a location-based user interface. The memory 705 also stores the data associated with or generated by the execution of the inventive steps.

Figure 8:
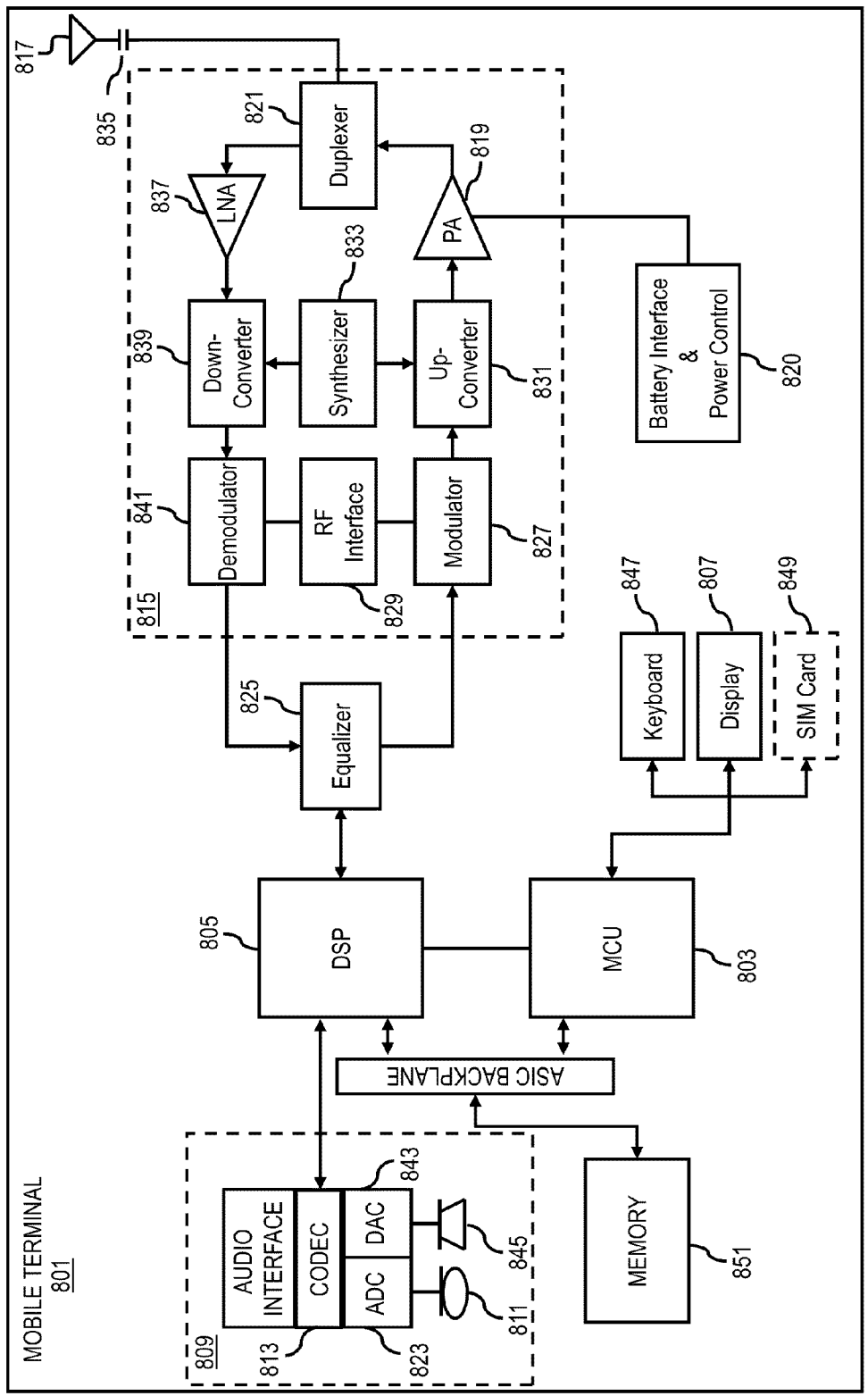
FIG. 8 is a diagram of a mobile terminal (e.g., handset) that can be used to implement an embodiment of the invention.

FIG. 8 is a diagram of exemplary components of a mobile terminal (e.g., handset) for communications, which is capable of operating in the system of FIG. 1, according to one embodiment. In some embodiments, mobile terminal 801, or a portion thereof, constitutes a means for performing one or more steps of displaying interactive preview information in a location-based user interface. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory (ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 803, a Digital Signal Processor (DSP) 805, and a receiver/transmitter unit including a microphone gain control unit and a speaker gain control unit. A main display unit 807 provides a display to the user in support of various applications and mobile terminal functions that perform or support the steps of displaying interactive preview information in a location-based user interface. The display 807 includes display circuitry configured to display at least a portion of a user interface of the mobile terminal (e.g., mobile telephone). Additionally, the display 807 and display circuitry are configured to facilitate user control of at least some functions of the mobile terminal. An audio function circuitry 809 includes a microphone 811 and microphone amplifier that amplifies the speech signal output from the microphone 811. The amplified speech signal output from the microphone 811 is fed to a coder/decoder (CODEC) 813.

A radio section 815 amplifies power and converts frequency in order to communicate with a base station, which is included in a mobile communication system, via antenna 817. The power amplifier (PA) 819 and the transmitter/modulation circuitry are operationally responsive to the MCU 803, with an output from the PA 819 coupled to the duplexer 821 or circulator or antenna switch, as known in the art. The PA 819 also couples to a battery interface and power control unit 820.

In use, a user of mobile terminal 801 speaks into the microphone 811 and his or her voice along with any detected background noise is converted into an analog voltage. The analog voltage is then converted into a digital signal through the Analog to Digital Converter (ADC) 823. The control unit 803 routes the digital signal into the DSP 805 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 825 for compensation of any frequency-dependent impairments that occur during transmission though the air such as phase and amplitude distortion. After equalizing the bit stream, the modulator 827 combines the signal with a RF signal generated in the RF interface 829. The modulator 827 generates a sine wave by way of frequency or phase modulation. In order to prepare the signal for transmission, an up-converter 831 combines the sine wave output from the modulator 827 with another sine wave generated by a synthesizer 833 to achieve the desired frequency of transmission. The signal is then sent through a PA 819 to increase the signal to an appropriate power level. In practical systems, the PA 819 acts as a variable gain amplifier whose gain is controlled by the DSP 805 from information received from a network base station. The signal is then filtered within the duplexer 821 and optionally sent to an antenna coupler 835 to match impedances to provide maximum power transfer. Finally, the signal is transmitted via antenna 817 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 801 are received via antenna 817 and immediately amplified by a low noise amplifier (LNA) 837. A down-converter 839 lowers the carrier frequency while the demodulator 841 strips away the RF leaving only a digital bit stream. The signal then goes through the equalizer 825 and is processed by the DSP 805. A Digital to Analog Converter (DAC) 843 converts the signal and the resulting output is transmitted to the user through the speaker 845, all under control of a Main Control Unit (MCU) 803 which can be implemented as a Central Processing Unit (CPU) (not shown).

The MCU 803 receives various signals including input signals from the keyboard 847. The keyboard 847 and/or the MCU 803 in combination with other user input components (e.g., the microphone 811) comprise a user interface circuitry for managing user input. The MCU 803 runs a user interface software to facilitate user control of at least some functions of the mobile terminal 801 to display interactive preview information in a location-based user interface. The MCU 803 also delivers a display command and a switch command to the display 807 and to the speech output switching controller, respectively. Further, the MCU 803 exchanges information with the DSP 805 and can access an optionally incorporated SIM card 849 and a memory 851. In addition, the MCU 803 executes various control functions required of the terminal. The DSP 805 may, depending upon the implementation, perform any of a variety of conventional digital processing functions on the voice signals. Additionally, DSP 805 determines the background noise level of the local environment from the signals detected by microphone 811 and sets the gain of microphone 811 to a level selected to compensate for the natural tendency of the user of the mobile terminal 801.

The CODEC 813 includes the ADC 823 and DAC 843. The memory 851 stores various data including call incoming tone data and is capable of storing other data including music data received via, e.g., the global Internet. The software module could reside in RAM memory, flash memory, registers, or any other form of writable storage medium known in the art. The memory device 851 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 849 carries, for instance, important information, such as the cellular phone number, the carrier supplying service, subscription details, and security information. The SIM card 849 serves primarily to identify the mobile terminal 801 on a radio network. The SIM card 849 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining to render, at a device, a user interface for a location-based service based, at least in part, on a field of view visible from a first vantage point;
   determining one or more items that are located outside of the field of view while visible from a second vantage point that is different from the first vantage point;
   causing, at least in part, processing of location information associated with the one or more items to determine occlusion information with respect to one or more user interface objects;

determining to render the one or more user interface objects in the user interface to depict a location of and a direction towards the one or more items based, at least in part, on the occlusion information; and determining to render a vantage point user interface object depicting the second vantage point at a position corresponding to a location of the second vantage point within the field of view, wherein the one or more user interface objects present, at least in part, preview information associated with the one or more items.

2. A method of claim 1, further comprising:

causing, at least in part, processing of one or more images of the one or more items visible from the second vantage point to select one of the images based on one or more criteria, wherein the one or more criteria include focus, user preference, or a combination thereof;

causing, at least in part, processing of the location information associated with the one or more items to determine the occlusion information further with respect to one or more obstacle user interface objects depicting one or more obstacles obstructing the one or more items from the field of view, the location-based service, or a combination thereof, wherein the second vantage point is different from the first vantage point two-dimensionally or three-dimensionally.

3. A method of claim 2, further comprising:

determining to render the one or more user interface objects to indicate a three dimensional origination of the one or more items based, at least in part, on the occlusion information, the first vantage point, and the second vantage point, wherein the image is rendered at an approximate location of at least one of the one or more items corresponding to a respective one of the one or more obstacle user interface objects, and wherein the vantage point user interface object is linked to the one or more user interface objects by one or more connecting lines in the user interface.

4. A method of claim 2, further comprising:

determining to render the one or more user interface objects on or near the one or more obstacle user interface objects so as to avoid occluding the one or more user interface objects based, at least in part, on the occlusion information.

5. A method of claim 1, further comprising:

receiving an input for creating a link between a location associated with the user interface and one or more other locations associated with the one or more user interface objects, the one or more items, or a combination thereof.

6. A method of claim 5, further comprising:

receiving another input for activation of the link, wherein the activation of the link toggles presentation of the one or more user interface objects, the one or more other locations, the one or more items, or a combination thereof in at least a portion of the user interface.

7. A method of claim 1, further comprising:

determining relevance information associated with the one or more items; and processing and/or facilitating a processing of the relevance information to determine an order for rendering or presenting the one or more user interface objects.

8. A method of claim 1, further comprising:

receiving an input for moving at least one of the one or more objects to one or more predetermined areas of the user interface, wherein the one or more predetermined areas are associated with a list of favorite objects, a list of objects to act upon, or a combination thereof.

9. A method of claim 1, wherein the preview information includes, at least in part, one or more representations of the one or more items, one or more representations of location information associated with the one or more items, content information associated with the one or more items, or a combination thereof.

10. A method of claim 1, wherein the user interface depicts, at least in part, a mixed reality view, an augmented reality view, an augmented virtual reality view, a panorama, or a combination thereof.

11. A method of claim 1, wherein the one or more items include, at least in part, points of interest, contact's registered addresses or shared locations, appointment locations, event locations, user-generated notes, or a combination thereof.

12. An apparatus comprising:

at least one processor; and at least one memory including computer program code for one or more programs, the at least one memory and the computer program code configured to, with the at least one processor, cause the apparatus to perform at least the following, determine to render, at a device, a user interface for a location-based service based, at least in part, on a field of view visible from a first vantage point;

determine one or more items that are located outside of the field of view while visible from a second vantage point that is different from the first vantage point;

process location information associated with the one or more items to determine occlusion information with respect to one or more user interface objects;

determine to render the one or more user interface objects in the user interface to depict a location of and a direction towards the one or more items based, at least in part, on the occlusion information; and determine to render a vantage point user interface object depicting the second vantage point at a position corresponding to a location of the second vantage point within the field of view, wherein the one or more user interface objects present, at least in part, preview information associated with the one or more items.

13. An apparatus of claim 12, wherein the apparatus is further caused to:

process of one or more images of the one or more items visible from the second vantage point to select one of the images based on one or more criteria, wherein the one or more criteria include focus, user preference, or a combination thereof;

process of the location information associated with the one or more items to determine the occlusion information further with respect to one or more obstacle user interface objects depicting one or more obstacles obstructing the one or more items from the field of view, the location-based service, or a combination thereof, wherein the second vantage point is different from the first vantage point two-dimensionally or three-dimensionally;

determine to render the one or more user interface objects to indicate a three dimensional origination of the one or more items based, at least in part, on the occlusion information, the first vantage point, and the second vantage point, wherein the image is rendered at an approximate location of at least one of the one or more items corresponding to a respective one of the one or more obstacle user interface objects, and wherein the vantage point user interface object is linked to the one or more user interface objects by one or more connecting lines in the user interface; and determine to render the one or more user interface objects on or near the one or more obstacle user interface objects so as to avoid occluding the one or more user interface objects based, at least in part, on the occlusion information.

14. A non-transitory computer-readable storage medium carrying one or more sequences of one or more instructions which, when executed by one or more processors, cause an apparatus to at least perform the following steps:

determining to render, at a device, a user interface for a location-based service based, at least in part, on a field of view visible from a first vantage point;

determining one or more items that are located outside of the field of view while visible from a second vantage point that is different from the first vantage point;

causing, at least in part, processing of location information associated with the one or more items to determine occlusion information with respect to one or more user interface objects;

determining to render the one or more user interface objects in the user interface to depict a location of and a direction towards the one or more items based, at least in part, on the occlusion information; and determining to render a vantage point user interface object depicting the second vantage point at a position corresponding to a location of the second vantage point within the field of view, wherein the one or more user interface objects present, at least in part, preview information associated with the one or more items.

15. A non-transitory computer-readable storage medium of claim 14, wherein the apparatus is caused to further perform:

processing of one or more images of the one or more items visible from the second vantage point to select one of the images based on one or more criteria, wherein the one or more criteria include focus, user preference, or a combination thereof;

processing of the location information associated with the one or more items to determine the occlusion information further with respect to one or more obstacle user interface objects depicting one or more obstacles obstructing the one or more items from the field of view, the location-based service, or a combination thereof, wherein the second vantage point is different from the first vantage point two-dimensionally or three-dimensionally;

determining to render the one or more user interface objects to indicate a three dimensional origination of the one or more items based, at least in part, on the occlusion information, the first vantage point, and the second vantage point, wherein the image is rendered at an approximate location of at least one of the one or more items corresponding to a respective one of the one or more obstacle user interface objects, and wherein the vantage point user interface object is linked to the one or more user interface objects by one or more connecting lines in the user interface; and determining to render the one or more user interface objects on or near the one or more obstacle user interface objects so as to avoid occluding the one or more user interface objects based, at least in part, on the occlusion information.

16. A method of claim 1, further comprising:

determining to move the one or more user interface objects corresponding to the second vantage point to one or more other positions within the user interface without changing the second vantage point.

17. A method of claim 3, wherein the vantage point user interface object includes a thumbnail of the one or more images, and the one or more connecting lines curve around the one or more obstacle user interface objects.

18. A method of claim 16, further comprising:

in response to the move, determining to skip displaying the vantage point user interface object in the user interface.

19. A method of claim 1, further comprising:

determining to switch from the field of view visible from the first vantage point to another field of view visible from the second vantage point by:

rendering the other field of view including the one or more user interface objects in the user interface, rendering in the user interface the one or more obstacle user interface objects, that are visible from the first vantage point while occluded by the one or more items in the other field of view based, at least in part, on the occlusion information, and render a second vantage point user interface object depicting the first vantage point at a position corresponding to a location of the first vantage point within the other field of view.

20. A method of claim 19, wherein the determination to switch is made in response to one user interaction with the user interface.

* * * * *